(12) United States Patent
Sato et al.

(10) Patent No.: US 6,761,998 B2
(45) Date of Patent: Jul. 13, 2004

(54) NON-AQUEOUS ELECTROLYTE SECONDARY CELL

(75) Inventors: Toshitada Sato, Osaka (JP); Yasuhiko Bito, Minamikawachi-gun (JP); Kazuhiro Okamura, Hirakata (JP); Yoshiaki Nitta, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 219 days.

(21) Appl. No.: 10/088,398

(22) PCT Filed: Jul. 17, 2001

(86) PCT No.: PCT/JP01/06189

§ 371 (c)(1),
(2), (4) Date: Mar. 18, 2002

(87) PCT Pub. No.: WO02/07239

PCT Pub. Date: Jan. 24, 2002

(65) Prior Publication Data

US 2003/0068558 A1 Apr. 10, 2003

(30) Foreign Application Priority Data

Jul. 19, 2000 (JP) ........................................ 2000-218528

(51) Int. Cl.[7] ................................................. H01M 4/58
(52) U.S. Cl. ................................................. 429/231.95
(58) Field of Search ........................ 429/231.95, 231.5, 429/225

(56) References Cited

U.S. PATENT DOCUMENTS 6,090,505 A * 7/2000 Shimamura et al. ...... 429/218.1
6,265,111 B1 * 7/2001 Bito et al. .............. 429/231.95
6,541,157 B1 * 4/2003 Inagaki et al. ........... 429/231.9
6,558,841 B1 * 5/2003 Nakagiri et al. ......... 429/218.1
6,599,662 B1 * 7/2003 Chiang et al. ........... 429/218.1
2002/0086207 A1 * 7/2002 Sato et al. ............... 429/218.1

FOREIGN PATENT DOCUMENTS

| JP | 11-086853 A | 3/1999 | | |
|---|---|---|---|---|
| JP | 11-086854 A | 3/1999 | | |
| JP | 2000-173611 A | 6/2000 | | |
| WO | WO 200024070 A1 | * | 4/2000 | ............. H01M/4/40 |
| WO | WO 200041256 A1 | * | 7/2000 | ............. H01M/4/38 |

OTHER PUBLICATIONS

Yoshio Idota, Tin Based Amorphous Oxide: A High–Capacity Lithium–Ion–Storage Material, Science, vol. 276, pp. 1395–1397 (May 30, 1997).

* cited by examiner

Primary Examiner—Gregg Cantelmo
(74) Attorney, Agent, or Firm—Akin Gump Strauss Hauer & Feld, LLP

(57) ABSTRACT

A non-aqueous electrolyte secondary battery containing an alloy particle capable of absorbing and desorbing lithium in the negative electrode has a short cycle life and is insufficient in high-rate discharge characteristics, since the alloy particle is pulverized during charge/discharge cycles. In order to solve this problem, a negative electrode is employed, which comprises an alloy particle containing: at least two selected from the group consisting of metal elements and semimetal elements; oxygen; and nitrogen. It is preferred that the alloy particle have a phase A capable of electrochemically absorbing and desorbing lithium ion and a phase B having lithium ion conductivity or lithium ion permeability and that the phase B contain larger amounts of oxygen and nitrogen than the phase A.

10 Claims, 2 Drawing Sheets

NON-AQUEOUS ELECTROLYTE SECONDARY CELL

TECHNICAL FIELD

The present invention relates to non-aqueous electrolyte secondary batteries. More specifically, the present invention relates to a non-aqueous electrolyte secondary battery including an improved negative electrode, and having high capacity, long life and excellent high-rate discharge characteristics.

BACKGROUND ART

In the positive electrode for a non-aqueous electrolyte secondary battery, chalcogenides such as $LiMn_2O_4$, $LiCoO_2$, $LiNiO_2$, $V_2O_5$, $Cr_2O_5$, $MnO_2$, $TiS_2$ and $MoS_2$ may be employed. They have a layered or tunneled structure permitting the intercalation and deintercalation of lithium ion.

On the other hand, metallic lithium may be employed in the negative electrode for a non-aqueous electrolyte secondary battery. In this case, a battery of high energy density and high voltage can be realized. However, the use of metallic lithium results in lithium dendrites deposited on the surface of the metallic lithium during charging, which may reduce the charge and discharge efficiency, or cause an internal short-circuit due to the contact between the dendrites and the positive electrode. Therefore, graphite-based carbon materials which have lower capacity than metallic lithium but are capable of reversibly absorbing and desorbing lithium, have recently been employed in the negative electrode. Then, lithium ion secondary batteries which are excellent in cycle characteristics and safety have been put into practical uses.

However, the practical capacity of the carbon material is as small as 350 mAh/g, and the theoretical density of carbon material is as low as 2.2 g/cc. Therefore, alloy particles capable of yielding a negative electrode having higher capacity are desired to be used as the negative electrode material.

However, an alloy is generally pulverized by its repeated expansion and contraction due to the intercalation and deintercalation of lithium ion. The pulverized alloy loses the contact with other alloy particles, conductive agent and the like in the negative electrode, reducing the conductivity of the negative electrode. In other words, the pulverized alloy appears to be an inactive material, so that the capacity of the battery is reduced.

In view of the above-described problems, the following proposals have been made.

Japanese Unexamined Patent Publication No. hei 11-86854 proposes to allow a phase capable of absorbing lithium and a phase incapable of absorbing the same to coexist in an alloy particle that is the negative electrode material. In a charged state, the phase incapable of absorbing lithium relaxes the expansion stress of the phase capable of absorbing lithium, so that the pulverization due to the expansion of the particle can be suppressed.

Japanese Unexamined Patent Publication No. hei 11-86853 proposes to allow two or more types of phases each capable of absorbing lithium to coexist in an alloy particle that is the negative electrode material. Although the both phases expand at the time of lithium absorption, the expansion stress of the respective phases are different from each other; therefore, the pulverization of the particle can be suppressed by narrowing the difference of the expansion coefficient between the two phases. The respective phases are present as fine crystal grains within the particle. It is considered that the stress is dispersed on the interfaces between the crystal grains at the time of lithium absorption.

However, even a negative electrode material in line with the above proposals is not sufficient to suppress the pulverization and to prevent the degradation of the cycle characteristics due to repeated charging and discharging. The possible reasons are as follows.

According to the former proposal, the expansion coefficients of the respective phases are significantly different from each other. Therefore, uneven stress is produced in the particle, causing a strong partial stress. The phase incapable of absorbing lithium is not able to sufficiently relax this stress. For this reason, it is considered that the particle is eventually pulverized and separated from the conductive network. In addition, the phase incapable of absorbing lithium prevents the movement of lithium ion, so that the high-rate discharge characteristics of the battery are not sufficient.

According to the latter proposal, the both phases absorb lithium ion and thus the difference of the expansion coefficient between the phases is small at the time of lithium absorption. However, the volume expansion of the entire particle is large and, therefore, it is likely that a gap is formed between particles or between a particle and a current collector thereby to deteriorate the current collection. For this reason, it is considered that alloy particles are more likely to be separated from the conductive network in the negative electrode. In other words, according to the latter proposal, it is difficult to suppress a reduction in discharge capacity during charge/discharge cycles, although it is possible to suppress the pulverization of the alloy particles due to the expansion and contraction.

On the other hand, there is also a proposal to employ metal oxides as the negative electrode material.

For example, Idota et al. proposes a negative electrode containing a tin oxide and having high capacity as well as long life (Science, 276, 5317, 1395–1397 (1997)). However, in the process of the initial charging, it is necessary to reduce bivalent or tetravalent tin in the tin oxide to a metallic state of zero valent. Accordingly, the irreversible capacity of the battery increases, resulting in an increased amount of lithium which does not participate in charge/discharge cycles. Therefore, only those batteries having low capacities can be obtained.

As described above, batteries using negative electrodes comprising conventional alloys and oxides have the problem that they are easily degraded in cycle characteristics and tend to have a decreased capacity.

DISCLOSURE OF INVENTION

It is an object of the present invention to provide a non-aqueous electrolyte secondary battery having high capacity, long cycle life and excellent high-rate discharge characteristics.

The present invention relates to a non-aqueous electrolyte secondary battery comprising: a positive electrode capable of absorbing and desorbing lithium ion; a negative electrode capable of absorbing and desorbing lithium ion; and a non-aqueous electrolyte containing a lithium salt, the negative electrode comprising: an alloy particle containing at least two selected from the group consisting of metal elements and semimetal elements; and one selected from the group consisting of oxygen and nitrogen, wherein the alloy particle has a phase A capable of electrochemically absorbing and desorbing lithium ion and a phase B which is incapable of electrochemically absorbing and desorbing lithium ion and has lithium ion conductivity or lithium ion permeability and wherein the total of an oxygen content Wao and a nitrogen content Wan is less than 0.5 wt % in the phase A and the total of an oxygen content Wbo and a nitrogen content Wbn is not less than 1.0 wt % in the phase B. As the semimetals, Si, Sb and the like may be used.

It is preferred that the phase A contain at least one selected from the group consisting of Sn, Si, Al, Ga, In, Pb, Sb and Bi.

It is preferred that the phase B contain at least one selected from the group consisting of Ti, Zr and rare earth elements.

It is preferred that the phase A be surrounded by the phase B.

It is preferred that the oxygen content Wao and the nitrogen content Wan in the phase A and the oxygen content Wbo and the nitrogen content Wbn in the phase B satisfy $\{(Wbo+Wbn)/(Wao+Wan))\}>4$.

It is preferred that an oxygen content Wo and a nitrogen content Wn in the alloy particles satisfy $0<Wo<10$ wt %, $0<Wn<10$ wt % and $0.5$ wt % $\leq Wo+Wn \leq 10$ wt %.

The alloy particles may further contain at least one selected from the group consisting of fluorine, sulfur and phosphorous. In this case, it is preferred that the total of a content Wf of at least one selected from the group consisting of fluorine, sulfur and phosphorous, the oxygen content Wo and the nitrogen content Wn be 0.5 to 10 wt % in the alloy particles. Additionally, it is preferred that the Wf be 0.5 to 1 wt %.

BEST MODE FOR CARRYING OUT THE INVENTION

Figure 1:
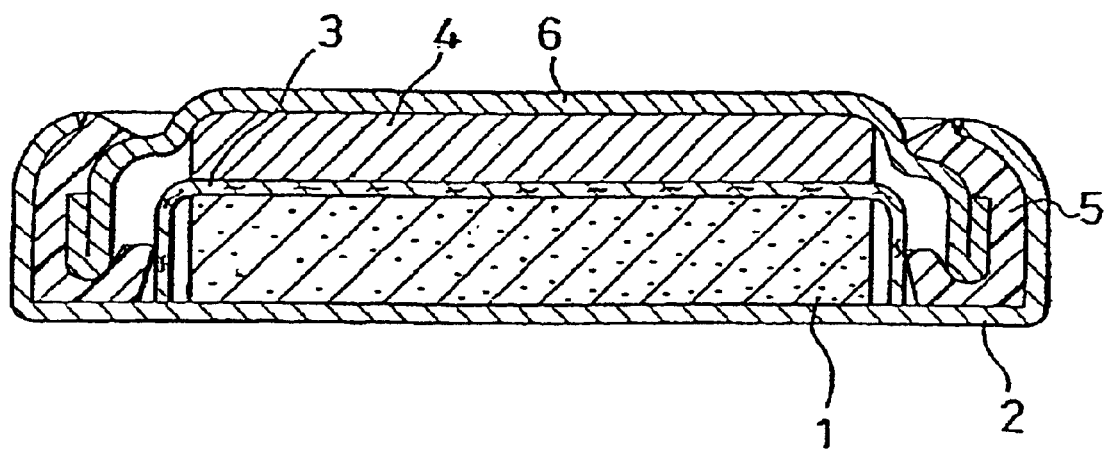
FIG. 1 is a vertical sectional view of a test cell used for evaluating the capacity characteristics of alloy particles in accordance with the present invention.

The present invention suppresses the pulverization of a negative electrode material comprising alloy particles due to the expansion and contraction, by the action of a phase B containing at least one selected from the group consisting of oxygen and nitrogen and having lithium ion conductivity or lithium ion permeability. It is considered that, when the phase B has lithium ion conductivity, the phase B has at least lithium ion permeability.

It is preferred that a phase A contain at least one element selected from the group consisting of Sn, Si, Al, Ga, In, Pb, Sb and Bi (hereinafter, referred to as "group A element"). Group A elements are those elements that are easy to electrochemically form an alloy with lithium. In the case of a lithium secondary battery which employs a negative electrode comprising a group A element, the amount of lithium absorption is large and a high capacity can be achieved.

It is preferred that the content of a group A element be not less than 50 mol % in the phase A.

It is preferred that the phase B comprise at least one element selected from the group consisting of Ti, Zr and rare earth elements (hereinafter, referred to as "group B element"). As the rare earth elements, for example, La, Ce and the like may be used.

Group B elements hardly react with lithium but have high reactivity with oxygen and nitrogen. Therefore, when a group A element and a group B element coexist in the presence of oxygen and nitrogen, the oxidation reaction and nitriding reaction of the group B element preferentially occur, whereas the oxidation reaction and nitriding reaction of the group A element are suppressed. When the above reactions occur in a state in which the group A element and the group B element either form an intermetallic compound or are fused, a low crystalline or amorphous phase B comprising fine crystal grains is formed since the group A element and the group B element are in a finely dispersed state to a sufficient degree. Accordingly, in the phase B, many grain boundaries are formed and no long-range order of atomic arrangement is observed. An alloy particle having such phase B has good plasticity, so that the pulverization of the phase A is difficult to occur. Moreover, it is possible to obtain alloy particles having good lithium ion conductivity and, therefore, a battery having good high-rate discharge characteristics can be realized.

It is preferred that the content of a group B element be 5 to 70 wt % in the alloy particle, from the viewpoint of ensuring the capacity. It is also preferred that the content be 5 to 30 wt %, from the viewpoint of ensuring the capacity, cycle life and high-rate discharge characteristics.

Although group A elements also react with oxygen and nitrogen, the reactivity is far lower than that of group B elements. Therefore, the amounts of lithium ions absorbed in and desorbed from the phase A are not reduced.

On the assumption that the phase B contains no group B element, oxygen and nitrogen similarly react not only with the phase B but also with the phase A in the presence of oxygen and nitrogen. Consequently, large amounts of oxides and nitrides are produced in the phase A to reduce the amounts of lithium absorbed in and desorbed from the phase A, thereby decreasing the capacity.

It is preferred that the phase A be surrounded by the phase B in the alloy particle.

Such structure of the alloy particle allows the stress generated by the expansion and contraction of the phase A to be effectively dispersed, thereby enhancing the effect of suppressing the pulverization.

It is preferred that an oxygen content Wao and a nitrogen content Wan in the phase A, as well as an oxygen content Wbo and a nitrogen content Wbn in the phase B satisfy $\{(Wbo+Wbn)/(Wao+Wan)\}>4$. In the case of $4 \geq \{(Wbo+Wbn)/(Wao+Wan)\}$, the oxygen and nitrogen contents increase in the phase A, so that the irreversible capacity during the initial charging becomes large.

From the viewpoint of the balance of the discharge capacity, life characteristics and high-rate discharge characteristics, it is preferred that the oxygen content Wo and the nitrogen content Wn in the alloy particles satisfy $0<Wo<10$ wt %, $0<Wn<10$ wt % and $0.5$ wt % $\leq Wo+Wn \leq 10$ wt %. When Wo+Wn is less than 0.5 wt %, the effect of suppressing the pulverization and improving the high-rate discharge characteristics of the present invention is reduced. On the other hand, when Wo+Wn exceeds 10 wt %, the irreversible capacity during the initial charging increases, which decreases the discharge capacity. Also, when the alloy particles excessively contain oxygen and nitrogen, the active material density is decreased, resulting in a decreased volume energy density. Therefore, it is most preferred that 1 wt % $\leq Wo+Wn \leq 5$ wt % be satisfied.

The alloy particle may comprise at least one selected from the group consisting of fluorine, sulfur and phosphorous, in addition to at least one selected from the group consisting of oxygen and nitrogen.

Fluorine, sulfur and phosphorous are selectively incorporated into the phase B, rather than into the phase A. When fluorine, sulfur or phosphorous is incorporated into the phase B, a fluoride, a sulfide or a phosphide is produced within the phase B. This improves the lithium ion conductivity or lithium ion permeability even further, thereby yielding excellent high-rate discharge characteristics.

In order to obtain a superior effect of suppressing the pulverization, it is preferred that the total of the content of at least one selected from the group consisting of fluorine, sulfur and phosphorous, the oxygen content and the nitrogen content be 0.5 to 10 wt %, more preferably, 1 to 5 wt % in the alloy particles.

To achieve a great effect of the stress relaxation by the phase B while preventing a decrease in the amounts of lithium absorbed in and desorbed from the phase A, it is preferred that not less than 70 wt % of the total amount of at least one selected from the group consisting of fluorine, sulfur and phosphorous, oxygen and nitrogen contained in the alloy particles be contained in the phase B.

Oxygen and nitrogen can be incorporated into the alloy by utilizing a process such as a gas atomization process, water atomization process or mechanical alloying process, while adjusting the amounts thereof. Similarly, at least one selected from the group consisting of fluorine, sulfur and phosphorous may be incorporated into the alloy.

In the following, the present invention will be concretely described by reference to examples.

EXAMPLES

Firstly, test cells and cylindrical batteries for evaluating alloy particles in accordance with the present invention are described.

(i) Test Cell

Test cells were used for evaluating the capacity characteristics of alloy particles.

The test cell shown in FIG. 1 was fabricated. 7.5 g of negative electrode alloy particles, 2 g of graphite powder as a conductive agent and 0.5 g of polyethylene powder as a binder were mixed to prepare a negative electrode mixture. 0.1 g of this mixture was press-formed so as to have a diameter of 17.5 mm, thereby producing a test electrode 1. The test electrode 1 was placed in a case 2. Then, a microporous separator of polypropylene 3 was placed on the test electrode 1.

A mixed solution of ethylene carbonate and dimethoxyethane at a volume ratio of 1:1 with 1 mol/L $LiClO_4$ dissolved therein was injected into the case 2 as a non-aqueous electrolyte.

The opening of the case 2 was sealed by a sealing plate 6, having metallic lithium 4 with a diameter of 17.5 mm attached to the inner surface thereof as well as a polypropylene gasket 5 disposed on the periphery thereof, thereby completing a test cell.

(ii) Cylindrical Battery

Cylindrical batteries were used for evaluating the high-rate discharge characteristics and cycle life.

Figure 2:
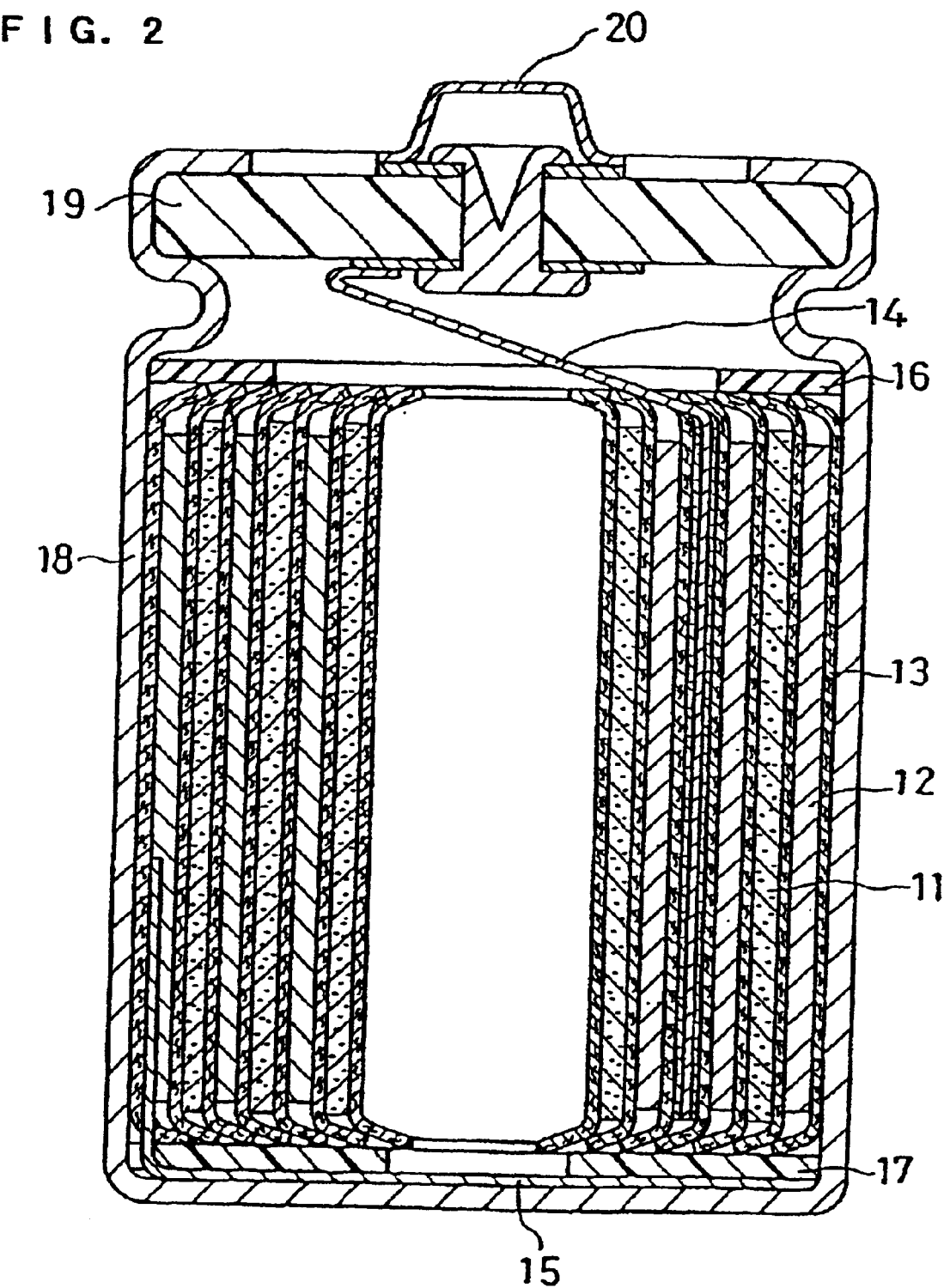
FIG. 2 is a vertical sectional view of a cylindrical battery comprising alloy particles in accordance with the present invention.

The cylindrical battery shown in FIG. 2 was fabricated. $LiMn_{1.8}Co_{0.2}O_4$ as a positive electrode active material was synthesized by mixing $Li_2CO_3$, $Mn_3O_4$ and $CoCO_3$ at a predetermined molar ratio and heating the mixture at 900° C. The positive electrode active material was sieved into not larger than 100 mesh.

To 100 g of the above positive electrode active material were added 10 g of carbon powder as a conductive agent, an aqueous dispersion containing 8 g of polytetrafluoroethylene as a binder and a proper amount of pure water, and the whole was sufficiently mixed to give a paste. The obtained paste was applied to an aluminum core, which was then dried and rolled to produce a positive electrode 11. To the positive electrode core, a positive electrode lead 14 made of aluminum was connected by ultrasonic welding.

Meanwhile, alloy particles, graphite powder as a conductive agent and styrene butadiene rubber as a binder were mixed at a weight ratio of 70:20:10, and the mixture thus obtained was added with a proper amount of water to give a paste. The obtained paste was applied to a copper core, which was then dried at 140° C. to produce a negative electrode 12. To the negative electrode core, a negative electrode lead 15 made of copper was connected by ultrasonic welding.

The positive electrode and negative electrode were rolled up in a spiral fashion, with a belt-shaped microporous separator 13 made of polypropylene interposed therebetween having a larger width than the both electrode plates, thereby constructing an electrode assembly. The electrode assembly was placed in a battery container 18, with polypropylene insulating plates 16 and 17 respectively disposed at the top and bottom thereof.

After a step was formed at the upper portion of the battery container 18, a mixed solution of ethylene carbonate and dimethoxyethane at a volume ratio of 1:1 with 1 mol/L $LiClO_4$ dissolved therein was injected into the battery container 18 as a non-aqueous electrolyte. The opening of the battery container 18 was sealed by a sealing plate 19 having a positive electrode terminal 20, thereby completing the fabrication of a cylindrical battery.

(iii) Evaluation of Capacity Characteristics

Charging (a reaction in which lithium ions are intercalated into the alloy particles) was performed on the test cell at a constant current of 0.5 $mA/cm^2$ until the terminal voltage became 0 V. Next, discharging (a reaction in which lithium ions are released from the alloy particles) was performed at a current of 0.5 $mA/cm^2$ until the terminal voltage became 1.5 V. Then, the discharge capacity ($C_{ini}$) was determined. Also, the ratio of the discharge capacity with respect to the charge capacity ($R_{disc/c}$) was determined in percentage. A low value of the percentage $R_{disc/c}$ indicated that there was a great occurrence of the irreversible reaction during the initial charging, that is, there was a large electrochemically irreversible capacity.

(iv) Evaluation of High-Rate Discharge Characteristics and Cycle Life

The cylindrical battery was charged at a constant current of 0.2 C (5-hour rate) at 20° C. until the battery voltage became 4.2 V and, thereafter, charged at a constant voltage of 4.2 V. Then, the first discharging was performed at a constant current of 0.2 C until the battery voltage became 3.0 V. In the second and later charging/discharging, the battery was charged under the same conditions as previously used, and discharged at a constant current of 2 C (0.5-hour rate) until the battery voltage became 3.0 V. The discharge capacity during the second discharging at a current of 2 C was divided by the capacity during the first discharging at a current of 0.2 C, and this was multiplied by 100 to determine a high-rate discharge ratio ($R_{2C/0.2C}$). It could be said that the closer the high-rate discharge ratio $R_{2C/0.2C}$ was to 100, the more excellent the high-rate discharge characteristics of the battery were. Further, the ratio of the discharge capacity at the 100th cycle to the discharge capacity at the 1st cycle ($R_{1st/100th}$) was determined in percentage as the cycle retention rate. It could be said that the closer the cycle retention rate $R_{1st/100th}$ was to 100, the more excellent the cycle characteristics of the battery were.

In the following, the method of producing alloy particles is described in detail; however, the alloy particles that can be used in the present invention are not limited thereto.

Examples 1 to 6

Alloy particles were synthesized in the following manner.

converting the resulting element ratio into the weight ratio. The result is shown in Table 1.

The oxygen content Wo in the alloy particles was determined by an infrared absorption method according to JIS Z2613. Also, the nitrogen content Wn in the alloy particles was determined by a thermal conductivity method according to JIS G1228. The result is shown in Table 1.

TABLE 1

| | | | Phase A | | | Phase B | | | | |
|---|---|---|---|---|---|---|---|---|---|---|
| | Material Composition | Gas | Composition | Wao (wt %) | Wan (wt %) | Composition | Wbo (wt %) | Wbn (wt %) | Wo (wt %) | Wn (wt %) | Wo + Wn (wt %) |
| Ex. 1 | $Ti_2Sn$ | $Ar + O_2(1\%)$ | Sn | 0.09 | 0.02 | $Ti_2Sn$ | 0.70 | 0.23 | 0.83 | 0.31 | 1.14 |
| Ex. 2 | | $Ar + O_2(3\%)$ | | 0.11 | 0.03 | | 1.09 | 0.31 | 1.23 | 0.38 | 1.61 |
| Ex. 3 | | $Ar + O_2(5\%)$ | | 0.15 | 0.02 | | 1.58 | 0.24 | 1.91 | 0.35 | 2.28 |
| Ex. 4 | | $N_2 + O_2(1\%)$ | | 0.07 | 0.11 | | 0.84 | 2.01 | 0.97 | 2.34 | 3.31 |
| Ex. 5 | | $N_2 + O_2(3\%)$ | | 0.10 | 0.15 | | 1.19 | 3.27 | 1.31 | 3.55 | 4.86 |
| Ex. 6 | | $N_2 + O_2(5\%)$ | | 0.13 | 0.17 | | 2.13 | 3.42 | 2.34 | 3.67 | 6.01 |
| Com. Ex. 1 | | Ar | | 0.02 | 0.01 | | 0.05 | 0.21 | 0.11 | 0.25 | 0.36 |
| Com. Ex. 2 | | $Ar + O_2(8\%)$ | | 3.47 | 0.05 | | 7.15 | 0.18 | 10.68 | 0.38 | 11.06 |
| Com. Ex. 3 | | $N_2 + O_2(8\%)$ | | 5.99 | 0.29 | | 5.22 | 10.83 | 11.34 | 14.33 | 25.67 |
| Com. Ex. 4 | FeSi | $Ar + O_2(1\%)$ | Si | 2.92 | 0.48 | $FeSi_2$ | 4.87 | 0.11 | 7.85 | 0.61 | 8.46 |
| Com. Ex. 5 | $FeSn_2$ | | Sn | 2.03 | 0.07 | FeSn | 3.33 | 0.40 | 5.37 | 0.48 | 5.85 |
| Com. Ex. 6 | NiAl | | Al | 7.21 | 0.30 | NiAl | 4.09 | 0.28 | 11.32 | 0.64 | 11.96 |
| Com. Ex. 7 | FeSi | $N_2 + O_2(1\%)$ | Si | 1.95 | 4.00 | $FeSi_2$ | 4.79 | 0.57 | 6.91 | 4.64 | 11.55 |
| Com. Ex. 8 | $FeSn_2$ | | Sn | 8.29 | 0.31 | FeSn | 5.01 | 5.59 | 13.40 | 5.99 | 19.39 |
| Com. Ex. 9 | NiAl | | Al | 3.37 | 1.78 | NiAl | 2.36 | 2.99 | 5.94 | 4.89 | 10.83 |

Bulky simple substance materials were mixed at a predetermined ratio according to the material composition ($Ti_2Sn$) shown in Table 1. The mixture thus obtained was cast with an arc melting furnace.

Subsequently, spherical alloy particles were yielded from the obtained cast alloy by using a gas atomization process.

In the gas atomization process, the diameter of the jet nozzle was 1 mm φ and the gas jet pressure was 100 kgf/cm².

As the jet gas, an argon gas containing 1% oxygen (Example 1), an argon gas containing 3% oxygen (Example 2), an argon gas containing 5% oxygen (Example 3), a nitrogen gas containing 1% oxygen (Example 4), a nitrogen gas containing 3% oxygen (Example 5) or a nitrogen gas containing 5% oxygen (Example 6) was used.

The alloy particles obtained by the gas atomization process were sifted through a 45 micron mesh sieve to give powders having a mean particle size of 28 μm.

X-ray diffraction analysis of the above-described alloy particles confirmed the existence of the phases A and phases B having the compositions shown in Table 1. Further, electron microprobe analysis (EPMA) of the cross sections of the particles also confirmed the existence of the phases A and phases B having the compositions shown in Table 1.

Then, an oxygen content Wao and a nitrogen content Wan in the phase A, as well as an oxygen content Wbo and a nitrogen content Wbn in the phase B were determined using a transmission electron microscope (TEM) and electron energy loss spectroscopy (EELS). More specifically, each of the oxygen content and the nitrogen content was determined by observing several points at a cross section of each particle by means of TEM while analyzing the same by EELS and In Table 1, the phase A of each of Examples 1 to 6 contained almost no oxygen and nitrogen, whereas the phase B contained large amounts of oxygen and nitrogen. This was presumably because Ti had reacted preferentially with oxygen and nitrogen. Additionally, the reason why the alloy particles also contained nitrogen even in the case of using the jet gas containing no nitrogen was probably due to the fact that the starting materials contained a trace amount of nitrogen.

Table 2 shows the results of the evaluation of the test cells and cylindrical batteries fabricated using the alloy particles.

TABLE 2

| | $C_{inl}$ mAh/g | $R_{disc/c}$ % | $R_{2\ C/0.2\ C}$ % | $R_{100th/1st}$ % |
|---|---|---|---|---|
| Ex. 1 | 428 | 83 | 91 | 89 |
| Ex. 2 | 431 | 79 | 93 | 92 |
| Ex. 3 | 444 | 77 | 94 | 95 |
| Ex. 4 | 433 | 80 | 93 | 91 |
| Ex. 5 | 439 | 77 | 95 | 94 |
| Ex. 6 | 446 | 74 | 97 | 97 |
| Com. Ex. 1 | 419 | 88 | 75 | 79 |
| Com. Ex. 2 | 394 | 53 | 94 | 83 |
| Com. Ex. 3 | 372 | 49 | 96 | 87 |
| Com. Ex. 4 | 702 | 57 | 84 | 70 |
| Com. Ex. 5 | 536 | 55 | 87 | 84 |
| Com. Ex. 6 | 677 | 59 | 86 | 55 |
| Com. Ex. 7 | 693 | 43 | 88 | 68 |
| Com. Ex. 8 | 524 | 50 | 84 | 72 |
| Com. Ex. 9 | 654 | 47 | 83 | 51 |

It was shown that each of the batteries of Examples 1 to 6 had a high discharge capacity and was excellent in high-rate discharge characteristics as well as cycle characteristics.

Comparative Examples 1 to 3

Spherical alloy particles were obtained in the same manner as in Example 1 except that the types of the jet gases used in the gas atomization process were changed to those shown in Table 1.

As the jet gas, an argon gas (Comparative Example 1), an argon gas containing 8% oxygen (Comparative Example 2) or a nitrogen gas containing 8% oxygen (Comparative Example 3) was used.

The obtained alloy particles were analyzed in the same manner as in Example 1. The results are shown in Table 1. Also, the test cells and cylindrical batteries fabricated using the alloy particles were evaluated in the same manner as in Example 1. The results are shown in Table 2.

In Table 1, in the case of the TiSn alloy synthesized by the gas atomization process using only the Ar gas containing neither oxygen nor nitrogen (Comparative Example 1), the oxygen content and the nitrogen content were low in the alloy particles, 0.11 wt % and 0.25 wt %, respectively. Further, the battery of Comparative Example 1, while having a high discharge capacity, was inferior to conventional lithium ion batteries in high-rate discharge characteristics and cycle life.

On the other hand, in the case of using the argon gas containing 8% oxygen (Comparative Example 2) and the nitrogen gas containing 8% oxygen (Comparative Example 3), the oxygen content and the nitrogen content each significantly increased in the alloy particles. However, as shown in Table 2, the initial ratio of the discharge capacity with respect to the charge capacity ($R_{disc/c}$) decreased. This was presumably because the oxygen content and nitrogen content in the phase A became so high that a large portion of the active phase A (Sn, in this case) was either oxidized or nitrided. In order for such phase A to absorb lithium ion, Sn was required to be reduced to a metallic state. This was considered to have resulted in an increased irreversible capacity.

Comparative Examples 4 to 6

Cast alloys were obtained in the same manner as in Example 1 except that granular simple substance materials were mixed at a predetermined ratio according to the material compositions shown in Table 1: FeSi (Comparative Example 4), $FeSn_2$ (Comparative Example 5) or NiAl (Comparative Example 6). Spherical alloy particles were yielded from the obtained cast alloy by using a gas atomization process under the same conditions as in Example 1.

The obtained alloy particles were analyzed in the same manner as in Example 1. The results are shown in Table 1. Also, the test cells and cylindrical batteries fabricated using the alloy particles were evaluated in the same manner as in Example 1. The result is shown in Table 2.

In each case of the alloy particles of Comparative Examples 4 to 6, the phase B did not contain Ti, Zr or rare earth elements. Therefore, as shown in Table 1, each of the oxygen content and the nitrogen content was high in the phase A, and the initial ratio of the discharge capacity with respect to the charge capacity ($R_{disc/c}$) was significantly decreased.

Examples 7 to 12

Granular simple substance materials were mixed at a predetermined ratio according to the material composition shown in Table 3: $CuZrSi_2$. The mixture thus obtained was cast with an arc melting furnace. Spherical alloy particles were yielded from the obtained cast alloy by using a gas atomization process under the same conditions as in Examples 1 to 6.

The obtained alloy particles were analyzed in the same manner as in Examples 1 to 6. The results are shown in Table 3. Also, the test cells and cylindrical batteries fabricated using the alloy particles were evaluated in the same manner as in Examples 1 to 6. The results are shown in Table 4.

TABLE 3

| | Material Composition | Ambience | Phase A Composition | Wao (wt %) | Wan (wt %) | Phase B Composition | Wbo (wt %) | Wbn (wt %) | Wo (wt %) | Wn (wt %) | Wo + Wn (wt %) |
|---|---|---|---|---|---|---|---|---|---|---|---|
| Ex. 7 | $CuZrSi_2$ | Ar + $O_2$(1%) | Si | 0.08 | 0.02 | CuZr | 1.72 | 0.27 | 1.86 | 0.33 | 2.19 |
| Ex. 8 | | Ar + $O_2$(3%) | | 0.11 | 0.02 | | 1.90 | 0.28 | 2.04 | 0.34 | 2.38 |
| Ex. 9 | | Ar + $O_2$(5%) | | 0.13 | 0.03 | | 3.00 | 0.41 | 3.24 | 0.48 | 3.72 |
| Ex. 10 | | $N_2$ + $O_2$(1%) | | 0.08 | 0.11 | | 1.47 | 2.53 | 1.57 | 2.66 | 4.23 |
| Ex. 11 | | $N_2$ + $O_2$(3%) | | 0.10 | 0.16 | | 1.81 | 2.90 | 1.96 | 3.17 | 5.13 |
| Ex. 12 | | $N_2$ + $O_2$(5%) | | 0.14 | 0.19 | | 2.32 | 3.25 | 2.51 | 3.49 | 6.00 |
| Ex. 13 | NiLaGa | $N_2$ | Ga | 0.15 | 0.21 | NiLa | 1.95 | 2.80 | 2.12 | 3.11 | 5.23 |
| Ex. 14 | $NiCeIn_2$ | | In | 0.13 | 0.25 | NiCe | 2.23 | 3.14 | 2.43 | 3.41 | 5.84 |

TABLE 4

| | $C_{int}$ mAh/g | $R_{disc/c}$ % | $R_{2\ C/0.2\ C}$ % | $R_{100th/1st}$ % |
|---|---|---|---|---|
| Ex. 7 | 643 | 84 | 90 | 87 |
| Ex. 8 | 651 | 82 | 94 | 91 |
| Ex. 9 | 659 | 79 | 95 | 94 |
| Ex. 10 | 648 | 82 | 91 | 89 |
| Ex. 11 | 653 | 78 | 94 | 92 |
| Ex. 12 | 668 | 75 | 96 | 95 |
| Ex. 13 | 512 | 72 | 91 | 94 |
| Ex. 14 | 693 | 78 | 94 | 97 |

In each case of the alloy particles of Examples 7 to 12, the oxygen content Wo and nitrogen content Wn contained in the entire alloy particles satisfied 0<Wo<10 wt %, 0<Wn<10 wt % and 0.5 wt %≦Wo+Wn≦10 wt %. Also, the batteries of Examples 7 to 12 each had a high capacity, excellent high-rate discharge characteristics and long life.

Examples 13 to 14

Granular simple substance materials were mixed at a predetermined ratio according to the material compositions shown in Table 3: NiLaGa or $NiCeIn_2$. The mixture thus obtained was cast with an arc melting furnace. Alloy particles were yielded from the obtained cast alloy by using water atomization process. The water atomization was performed under a nitrogen atmosphere. The oxygen and nitrogen incorporated into the alloy in the water atomization process were supplied from the oxygen and nitrogen dissolved in water and also from the oxygen generated by the oxidation of water at the time of the collision of water and a molten metal.

In the water atomization process, water with a jet pressure of 800 kgf/cm$^2$ was collided with the molten metal of the alloy to rapidly cool and pulverize the alloy. The alloy particles thus obtained were sifted through a 45 micron mesh sieve to give powders having a mean particle size of 20 μm.

The obtained alloy particles were analyzed in the same manner as in Example 1. The results are shown in Table 3. Also, the test cells and cylindrical batteries fabricated using the alloy particles were evaluated in the same manner as in Example 1. The results are shown in Table 4.

Analysis of the cross sections of the particles by means of EPMA revealed that an oxide film having a mean thickness of approximately 18 nm was formed on the surface of each particle synthesized by the water atomization process.

From Table 3, it was shown that considerably larger amounts of oxygen and nitrogen were incorporated into the phase B, than into the phase A.

In each case of the alloy particles of Examples 13 to 14, the oxygen content Wo and nitrogen content Wn contained in the entire alloy particles satisfied 0<Wo<10 wt %, 0<Wn<10 wt % and 0.5 wt %≦Wo+Wn≦10 wt %. Also, the batteries of Examples 13 to 14 each had a high capacity, excellent high-rate discharge characteristics and long life.

In Examples 1 to 14 described above, observation with TEM and electron beam diffraction analysis revealed that the phase B containing large amounts of oxygen and nitrogen was in a low crystalline or amorphous state. A portion of the phase B formed fine oxides and nitrides, thereby producing many grain boundaries in the phase. Because of this, the conductive network of lithium ion increased within the particles, good lithium ion conductivity was achieved and the high-rate discharge characteristics of the battery were improved. Moreover, since the phase B was suited to absorb the stress caused by the expansion and contraction of the phase A, the cycle life of the battery was also improved. While the incorporation of oxygen into the phase B was able to provide the effect of the stress relaxation to some extent, the additional incorporation of nitrogen into the phase B was considered to have significantly improved the effect of the stress relaxation.

Examples 15 to 19

Alloy particles were synthesized in the following manner.

Into a stainless steel pot mill (capacity 500 ml) containing therein 25 stainless steel balls (diameter 4.8 cm), simple substance materials having a particle size of not more than 45 μm were supplied at a predetermined ratio according to the material compositions shown in Table 5: TiPb (Example 15), ZrSb$_2$ (Example 16), TiCoBi (Example 17), Ti$_2$Sn (Example 18) or TiSi$_2$ (Example 19).

In Examples 15 to 17, predetermined additives having a particle size of not more than 45 μm shown in Table 5 were also supplied into the pot mill at the respective ratios shown in Table 5 with respect to the total amount of the materials and additives. In the case of adding fluorine to the alloy, a granular powder of LiF was used as the additive.

The total amount of the materials to be supplied into the pot mill was set at 15 g, including the additive.

An argon gas containing 3% oxygen was charged in the pot mill.

The pot mill was operated at a constant revolution of 60 rpm for 10 days. As a result, alloy particles having a mean particle size of approximately 0.8 gm were obtained.

X-ray diffraction analysis of the obtained alloy particles revealed that each alloy particles had a broad diffraction pattern and thus was in a low crystalline or amorphous state. Further, the phase structures of the alloy particles were analyzed by using the above diffraction patterns and TEM. As a result, it was found that all the powders had the phases A and the intermetallic compound phases B shown in Table 5.

Then, the obtained alloy particles were analyzed in the same manner as in Example 1. The results are shown in Table 5. Also, the test cells and cylindrical batteries fabricated using the alloy particles were evaluated in the same manner as in Example 1. The results are shown in Table 6.

TABLE 5

| | Material Composition | Ambience | Additive | Added amount wt % | Phase A | | | Phase B | | | Wo (wt %) | Wn (wt %) | Wo + Wn (wt %) |
|---|---|---|---|---|---|---|---|---|---|---|---|---|---|
| | | | | | Composition | Wao (wt %) | Wan (wt %) | Composition | Wbo (wt %) | Wbn (wt %) | | | |
| Ex. 15 | TiPb | Ar + O$_2$(3%) | LiF | 1.00 | Pb | 0.09 | 0.02 | PbTi$_4$ | 0.93 | 0.30 | 1.08 | 0.34 | 1.42 |
| Ex. 16 | ZrSb$_2$ | | S | 0.50 | Sb | 0.10 | 0.03 | SbZr | 1.48 | 0.15 | 1.62 | 0.22 | 1.84 |
| Ex. 17 | TiCoBi | | P | 1.00 | Bi | 0.13 | 0.02 | Co$_2$Ti | 2.35 | 0.11 | 2.54 | 0.19 | 2.73 |
| Ex. 18 | Ti$_2$Sn | | — | — | Sn | 0.12 | 0.04 | Ti$_6$Sn$_5$ | 3.48 | 0.42 | 3.67 | 0.55 | 4.22 |
| Ex. 19 | TiSi$_2$ | | — | — | Si | 0.10 | 0.02 | TiSi | 4.10 | 0.35 | 4.26 | 0.43 | 4.69 |
| Ex. 20 | TiPb | N$_2$ + O$_2$(3%) | LiF | 1.00 | Pb | 0.17 | 0.21 | PbTi$_4$ | 2.46 | 3.41 | 2.64 | 3.67 | 6.31 |
| Ex. 21 | ZrSb$_2$ | | S | 0.50 | Sb | 0.11 | 0.12 | SbZr | 3.14 | 4.10 | 3.17 | 4.25 | 7.42 |
| Ex. 22 | ToCoBi | | P | 1.00 | Bi | 0.14 | 0.20 | Co$_2$Ti | 3.05 | 2.88 | 3.22 | 3.12 | 6.34 |
| Ex. 23 | Ti$_2$Sn | | — | — | Sn | 0.16 | 0.13 | Ti$_6$Sn$_5$ | 4.09 | 5.12 | 4.28 | 5.29 | 9.57 |
| Ex. 24 | TiSi$_2$ | | — | — | Si | 0.14 | 0.17 | TiSi | 4.53 | 4.62 | 4.69 | 4.87 | 9.56 |
| Com. Ex. 10 | TiPb | Ar | LiF | 1.00 | Pb | 0.02 | 0.01 | PbTi$_4$ | 0.14 | 0.10 | 0.19 | 0.14 | 0.33 |
| Com. Ex. 11 | ZrSb$_2$ | | S | 0.50 | Sb | 0.03 | 0.04 | SbZr | 0.11 | 0.21 | 0.17 | 0.26 | 0.43 |
| Com. Ex. 12 | TiCoBi | | P | 1.00 | Bi | 0.02 | 0.03 | Co$_2$Ti | 0.17 | 0.16 | 0.21 | 0.22 | 0.43 |
| Com. Ex. 3 | Ti$_2$Sn | | — | — | Sn | 0.04 | 0.05 | Ti$_6$Sn$_5$ | 0.19 | 0.11 | 0.26 | 0.18 | 0.44 |
| Com. Ex. 14 | TiSi$_2$ | | — | — | Si | 0.03 | 0.04 | TiSi | 0.08 | 0.14 | 0.14 | 0.19 | 0.33 |
| Com. Ex. 15 | TiPb | Air | LiF | 1.00 | Pb | 3.90 | 0.22 | PbTi$_4$ | 6.42 | 9.01 | 10.34 | 9.24 | 19.58 |
| Com. Ex. 16 | ZrSb$_2$ | | S | 0.50 | Sb | 5.11 | 0.31 | SbZr | 4.13 | 10.01 | 9.28 | 10.35 | 19.63 |
| Com. Ex. 17 | TiCoBi | | P | 1.00 | Bi | 4.73 | 0.18 | Co$_2$Ti | 7.57 | 9.25 | 12.35 | 9.47 | 21.82 |

TABLE 5-continued

| | Material Composition | Ambience | Additive | Added amount wt % | Composition | Phase A Wao (wt %) | Wan (wt %) | Composition | Phase B Wbo (wt %) | Wbn (wt %) | Wo (wt %) | Wn (wt %) | Wo + Wn (wt %) |
|---|---|---|---|---|---|---|---|---|---|---|---|---|---|
| Com. Ex. 18 | Ti$_2$Sn | — | — | — | Sn | 6.22 | 0.24 | Ti$_6$Sn$_5$ | 4.81 | 11.09 | 11.06 | 11.38 | 22.44 |
| Com. Ex. 19 | TiSi$_2$ | — | — | — | Si | 5.39 | 3.71 | TiSi | 2.27 | 6.33 | 7.69 | 10.08 | 17.77 |

TABLE 6

| | C$_{ini}$ mAh/g | R$_{disc/c}$ % | R$_{2\ C/0.2\ C}$ % | R$_{100th/1st}$ % |
|---|---|---|---|---|
| Ex. 15 | 521 | 83 | 91 | 89 |
| Ex. 16 | 724 | 80 | 93 | 87 |
| Ex. 17 | 536 | 77 | 92 | 91 |
| Ex. 18 | 426 | 80 | 94 | 97 |
| Ex. 19 | 719 | 77 | 93 | 94 |
| Ex. 20 | 534 | 74 | 95 | 90 |
| Ex. 21 | 694 | 79 | 94 | 92 |
| Ex. 22 | 544 | 74 | 91 | 93 |
| Ex. 23 | 451 | 79 | 96 | 98 |
| Ex. 24 | 720 | 73 | 94 | 95 |
| Com. Ex. 10 | 551 | 85 | 83 | 55 |
| Com. Ex. 11 | 742 | 82 | 85 | 64 |
| Com. Ex. 12 | 549 | 80 | 81 | 66 |
| Com. Ex. 13 | 437 | 84 | 78 | 78 |
| Com. Ex. 14 | 736 | 79 | 74 | 61 |
| Com. Ex. 15 | 511 | 50 | 84 | 49 |
| Com. Ex. 16 | 694 | 47 | 86 | 60 |
| Com. Ex. 17 | 512 | 49 | 85 | 58 |
| Com. Ex. 18 | 396 | 59 | 83 | 70 |
| Com. Ex. 19 | 679 | 43 | 84 | 60 |

Examples 20 to 24

The same operations as in Examples 15 to 19 were performed except that a nitrogen gas containing 3% oxygen was charged in the pot mill, thereby obtaining alloy particles having a mean particle size of approximately 0.8 μm. X-ray diffraction analysis of the obtained alloy particles revealed that the alloy particles each had a broad diffraction pattern and thus was in a low crystalline or amorphous state. Further, the phase structures of the alloy particles were analyzed by using the above diffraction patterns and TEM. As a result, it was found that all the powders had the phases A and the intermetallic compound phases B shown in Table 5.

Then, the obtained alloy particles were analyzed in the same manner as in Example 1. The results are shown in Table 5. Also, the test cells and cylindrical batteries fabricated using the alloy particles were evaluated in the same manner as in Example 1. The results are shown in Table 6.

Comparative Examples 10 to 14

The same operations as in Examples 15 to 19 were performed except that an argon gas having a purity of 99.999% was charged in the pot mill, thereby obtaining alloy particles having a mean particle size of approximately 0.8 μm. X-ray diffraction analysis of the obtained alloy particles revealed that the alloy particles each had a broad diffraction pattern and thus was in a low crystalline or amorphous state. Further, the phase structures of the alloy particles were analyzed by using the above diffraction patterns and TEM. As a result, it was found that all the powders had the phases A and the intermetallic compound phases B shown in Table 5.

Then, the obtained alloy particles were analyzed in the same manner as in Example 1. The results are shown in Table 5. Also, the test cells and cylindrical batteries fabricated using the alloy particles were evaluated in the same manner as in Example 1. The results are shown in Table 6.

The reason why the cycle characteristics were insufficient in each case of Comparative Examples 10 to 14 was presumably because the alloy particles contained almost no oxygen and nitrogen, so that there were few grain boundaries within the particles and the expansion stress was difficult to be relaxed.

Comparative Examples 15 to 19

The same operations as in Examples 15 to 19 were performed except that air was charged in the pot mill, thereby obtaining alloy particles having a mean particle size of approximately 0.8 μm. X-ray diffraction analysis of the obtained alloy particles revealed that the alloy particles each had a broad diffraction pattern and thus was in a low crystalline or amorphous state. Further, the phase structures of the alloy particles were analyzed by using the above diffraction patterns and TEM. As a result, it was found that all the powders had the phases A and the intermetallic compound phases B shown in Table 5.

Then, the obtained alloy particles were analyzed as in Example 1. The results are shown in Table 5. Also, the test cells and cylindrical batteries fabricated using the alloy particles were evaluated in the same manner as in Example 1. The results are shown in Table 6.

In Table 5, larger amounts of oxygen and nitrogen were contained in the phase B in each case of Examples 15 to 24, as compared with Comparative Examples 10 to 14.

In Table 6, the batteries of Examples 15 to 24 were superior in high-rate discharge characteristics and life characteristics. On the other hand, the batteries of Comparative Examples 10 to 14, which contained the alloy particles synthesized under an Ar gas atmosphere of high purity, were insufficient in life characteristics and high-rate discharge characteristics.

It was also shown that the batteries of Comparative Examples 15 to 19, which contained the alloy particles synthesized under an air atmosphere, had a large irreversible capacity because the oxygen content and the nitrogen content were too large in the phase A of the alloy particles.

It should be noted that most of the additives were detected only in the phase B.

As described above, the batteries using in the negative electrodes, the alloy particles of Examples in accordance with the present invention had a higher capacity and exhibited superior cycle characteristics as well as high-rate discharge characteristics, as compared with the batteries of Comparative Examples. Moreover, in the case of the alloy particles having excellent properties, not less than 70 wt % of the total amount of oxygen and nitrogen was contained in the phase B. Also, in the case of the alloy particles yielding a battery having high capacity and superior high-rate discharge capacity and long life, the oxygen content Wo and the nitrogen content Wn satisfied $0<Wo<10$ wt %, $0<Wn<10$ wt % and 0.5 wt % $\leq Wo+Wn \leq 10$ wt %.

Although $LiMn_{1.8}Co_{0.2}O_4$ was used as the positive electrode in the above-described examples, the same effect can certainly be obtained by using $LiMn_2O_4$, $LiCoO_2$, $LiNiO_2$ and the like.

Industrial Applicability

As described above, according to the present invention, it is possible to obtain a highly reliable non-aqueous electrolyte secondary battery which has high capacity, long life as well as excellent high-rate discharge characteristics and which is free from short-circuit due to lithium dendrites.

What is claimed is:

1. A non-aqueous electrolyte secondary battery comprising: a positive electrode capable of absorbing and desorbing lithium ion; a negative electrode capable of absorbing and desorbing lithium ion; and a non-aqueous electrolyte containing a lithium salt, said negative electrode comprising: an alloy particle containing at least two selected from the group consisting of metal elements and semimetal elements; and both oxygen and nitrogen, wherein said alloy particle has a phase A capable of electrochemically absorbing and desorbing lithium ion and a phase B which is incapable of electrochemically absorbing and desorbing lithium ion and has lithium ion conductivity or lithium ion permeability, and wherein an oxygen content Wo and a nitrogen content Wn in said alloy particle satisfy $0<Wo<10$ wt %, $0<Wn<10$ wt % and 0.5 wt % $\leq Wo+Wn \leq 10$ wt %.

2. The non-aqueous electrolyte secondary battery in accordance with claim 1, wherein the total of an oxygen content Wao and a nitrogen content Wan is less than 0.5 wt % in said phase A and the total of an oxygen content Wbo and a nitrogen content Wbn is not less than 1.0 wt % in said phase B.

3. The non-aqueous electrolyte secondary battery in accordance with claim 1, wherein said phase A contains at least one selected from the group consisting of Sn, Si, Al, Ga, In, Pb, Sb and Bi and wherein said phase B contains at least one selected from the group consisting of Ti, Zr and rare earth elements.

4. The non-aqueous electrolyte secondary battery in accordance with claim 1, wherein said phase A is surrounded by said phase B.

5. The non-aqueous electrolyte secondary battery in accordance with claim 1, wherein said oxygen content Wao and said nitrogen content Wan in said phase A and said oxygen content Wbo and said nitrogen content Wbn in said phase B satisfy $\{(Wbo=Wbn)/(Wao=Wan)\}>4$.

6. The non-aqueous electrolyte secondary battery in accordance with claim 1, wherein said alloy particle further contains at least one selected from the group consisting of fluorine, sulfur and phosphorous and when the total of said oxygen content Wo, said nitrogen content Wn, and a content Wf of at least one selected from the group consisting of fluorine, sulfur and phosphorous, is 0.5 to 10 wt % in said alloy particle.

7. The non-aqueous electrolyte secondary battery in accordance with claim 2, wherein said phase A contains at least one selected from the group consisting of Sn, Si, Al, Ga, In, Pb, Sb and Bi and wherein said phase B contains at least one selected from the group consisting of Ti, Zr and rare earth elements.

8. The non-aqueous electrolyte secondary battery in accordance with claim 2, wherein said phase A is surrounded by said phase B.

9. The non-aqueous electrolyte secondary battery in accordance with claim 2, wherein said oxygen content Wao and said nitrogen content Wan in said phase A and said oxygen content Wbo and said nitrogen content Wbn in said phase B satisfy $\{(Wbo=Wbn)/(Wao=Wan)\}>4$.

10. The non-aqueous electrolyte secondary battery in accordance with claim 2, wherein said alloy particle further contains at least one selected from the group consisting of fluorine, sulfur and phosphorous and wherein the total of said oxygen content Wo, said nitrogen content Wn, and a content Wf of at least one selected from the group consisting of fluorine, sulfur and phosphorous, is 0.5 to 10 wt % in said alloy particle.

* * * * *

UNITED STATES PATENT AND TRADEMARK OFFICE
CERTIFICATE OF CORRECTION

PATENT NO. : 6,761,998 B2
DATED : July 13, 2004
INVENTOR(S) : Toshitada Sato et al.

It is certified that error appears in the above-identified patent and that said Letters Patent is hereby corrected as shown below:

<u>Title page, Item [54] and Column 1, line 2,</u>
Title, "CELL" should be replaced with -- BATTERY --.

<u>Column 16,</u>
Lines 10 and 32, "$\{(Wbo=Wbn)/(Wao=Wan)\}>4$" should read -- $\{(Wbo+Wbn)/(Wao+Wan)\}>4$ --.

Signed and Sealed this

Eleventh Day of January, 2005

JON W. DUDAS
*Director of the United States Patent and Trademark Office*